United States Patent [19]

Kawarada et al.

[11] 4,222,647
[45] Sep. 16, 1980

[54] ADAPTOR FOR AUTO STROBO UNIT

[75] Inventors: Osamu Kawarada, Fuchu; Takeshi Nakane; Isao Kondo, both of Hachioji, all of Japan

[73] Assignee: Olympus Optical Co., Ltd., Tokyo, Japan

[21] Appl. No.: 966,259

[22] Filed: Dec. 4, 1978

[30] Foreign Application Priority Data

Dec. 26, 1977 [JP] Japan ............................... 52-158281

[51] Int. Cl.³ ............................................. G03B 15/05
[52] U.S. Cl. .................................................... 354/145
[58] Field of Search ............... 354/33, 60 F, 136, 139, 354/149, 145

[56] References Cited

U.S. PATENT DOCUMENTS

| | | | |
|---|---|---|---|
| 3,737,721 | 6/1973 | Ogawa ................................... | 354/33 |
| 3,776,112 | 12/1973 | Wilwerding ........................... | 354/33 |
| 3,995,286 | 11/1976 | Tokutomi ............................... | 354/33 |
| 4,085,353 | 4/1978 | Adams et al. .......................... | 354/33 |
| 4,095,242 | 6/1978 | Tsunekawa et al. .................. | 354/139 |
| 4,095,245 | 6/1978 | Kuraishi ................................ | 354/145 |

*Primary Examiner*—Michael L. Gellner
*Attorney, Agent, or Firm*—Weinstein & Sutton

[57] ABSTRACT

An adaptor for an auto strobo unit comprises a trigger signal feed circuit for supplying a trigger signal to a flashlight trigger circuit of said auto strobo unit in response to the closure of a synchro contact of an automatic exposure controlled camera, a polarity inverter for inverting the polarity of an illumination interrupt signal supplied by a photometric control circuit of the camera to a polarity which is suitable to activate an illumination interrupt circuit of the auto strobo unit, an amplifier for amplifying an illumination interrupt signal to a given level, and circuit means for feeding the polarity inverter or the amplifier when the trigger signal feed circuit is operated. The adaptor enables an automatic exposure controlled camera to be combined with any kind of an auto strobo unit.

9 Claims, 5 Drawing Figures

ADAPTOR FOR AUTO STROBO UNIT

BACKGROUND OF THE INVENTION

The invention relates to an adaptor for auto strobo units, and more particularly, to an adaptor which is used to couple an internal electrical circuit of a camera with the electrical circuit of an auto strobo unit.

As is well recognized, an auto strobo unit comprises a photometric control circuit which produces an illumination interrupt signal when the flashlight illumination reaches an optimum value for an object being photographed, thus automatically stopping the illumination. Various forms of auto strobo units are known including one having a photometric control circuit which comprises a light receiving element, another having no photometric control circuit but having an illumination interrupt terminal to which an illumination interrupt signal may be externally applied or a further version which includes both the photometric control circuit and the illumination interrupt terminal adapted to be connected with an external circuit.

An auto strobo unit having an illumination interrupt terminal, is combined with a camera of the type in which the exposure is automatically controlled, so that an illumination interrupt signal is derived from a photometric control circuit contained within the camera and is applied to the illumination interrupt terminal. Hence, an auto strobo unit having only the illumination interrupt terminal cannot properly function as an auto strobo unit unless it is coupled with such an automatic exposure controlled camera.

An auto strobo unit having an illumination interrupt terminal is designed to have an illumination interrupt signal of positive polarity applied to said terminal. This signal inhibits the interruption of the illumination in response to the application of a signal of a negative polarity. This is because various makers employ a design scheme, sometimes referred to as a system or systematized camera, in which accessories associated with a particular camera are specially designed to suit it. However, recently, a combination of a camera and an auto strobo unit has been offered in which an illumination interrupt signal of a negative polarity is derived from a system camera and applied to the illumination interrupt terminal of the unit. However, this auto strobo unit cannot be coupled with a camera of the type which produces an illumination interrupt signal of a positive polarity. Conversely, a camera which produces an illumination interrupt signal of a negative polarity cannot be coupled with an auto strobo unit having an illumination interrupt terminal which is designed to receive a signal of a positive polarity.

In a combination of a systematized camera and an auto strobo unit, an illumination interrupt signal which is derived from a photometric control circuit including a light receiving element is of a low magnitude and hence is amplified to a given level either within the camera or in the strobo unit. This presents no problem whatsoever in a systematized combination. However, when the combination includes a camera which is not of the systematized type, the magnitude of the output voltage is insufficient to provide a satisfactory operation even though the signal has the proper polarity. In other words, the combination will not operate if the amplification feature is not provided in either the strobo unit or the camera. As a result, the conventional auto strobo unit failed to enjoy an interchangeability and a universal acceptance in the art because of the systematized limitation even though it has an effective light conditioning feature.

SUMMARY OF THE INVENTION

It is an object of the invention to provide an adaptor for an auto strobo unit which avoids the above disadvantages by internally housing a polarity inverter and/or an amplifier circuit which inverts the polarity of an illumination interrupt signal and/or which amplifies it so that an illumination interrupt signal derived from a camera can be applied to an illumination interrupt terminal of the auto strobo unit to assure an optimum operation thereof.

In accordance with the invention, an illumination interrupt signal derived from a photometric control circuit of a camera of the type in which the exposure is automatically controlled may have either positive or negative polarity. The signal may have a magnitude which is insufficient in itself to operate the illumination interrupt circuit of the strobo unit. In these instances, the adaptor changes the polarity or the voltage level of the signal so as to be effective to operate the auto strobo unit. In this manner, it avoids the limitation imposed by the systematized design of cameras, extending the applicability and interchangeability of both cameras and strobo units.

DESCRIPTION OF THE PREFERRED EMBODIMENTS

Figure 1:
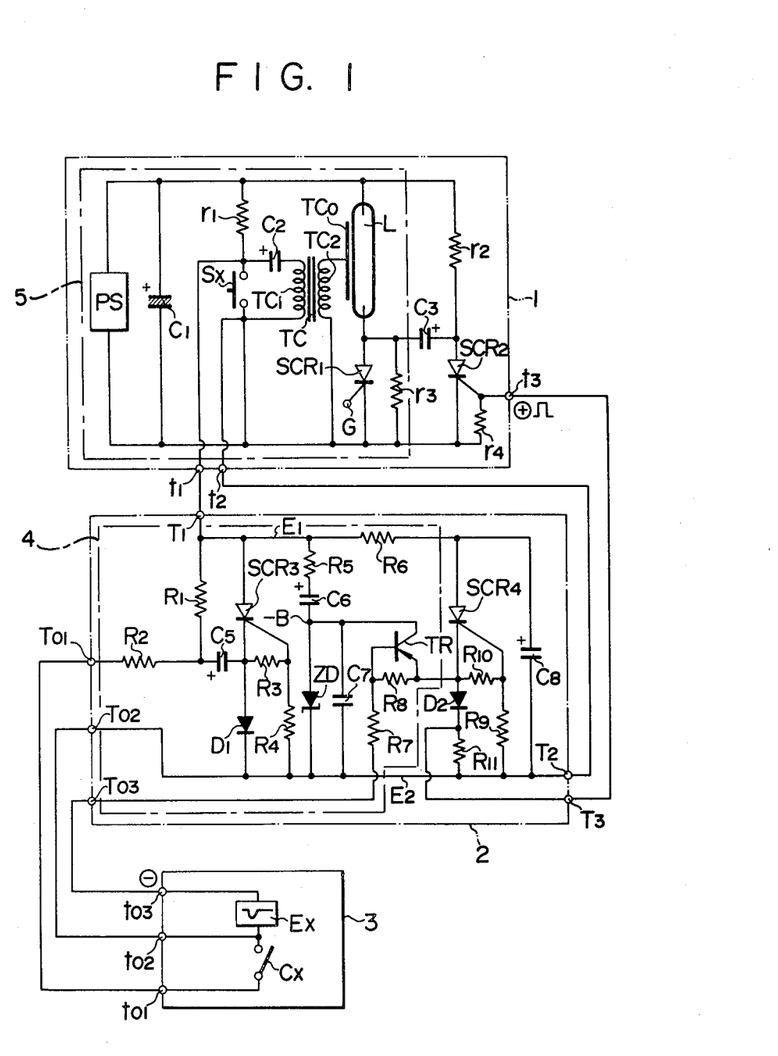
FIG. 1 is a circuit diagram of the adaptor according to one embodiment of the invention.

Referring to FIG. 1, there is shown a first embodiment of the invention which is adapted to assure an illumination interrupt operation for a combination of an automatic exposure controlled camera having a photometric control circuit which produces an illumination interrupt signal of a negative polarity and an auto strobo unit having an illumination interrupt terminal to which an illumination interrupt signal of a positive polarity must be applied to interrupt the illumination. Thus, in the present embodiment, the adaptor inverts the polarity of the illumination interrupt signal from the camera to match the polarity of the illumination interrupt signal to the polarity required by the illumination interrupt terminal of the auto strobo unit before it is applied to the illumination interrupt terminal of the auto strobo unit.

Referring to FIG. 1, the electrical circuit of the auto strobo unit is shown within a block 1 indicated by double dot chain lines. The electrical circuit of the adaptor of the invention is shown in a block 2 indicated by single dot chain lines while the electrical circuit shown within a block 3 indicated by a solid line illustrates part of the electrical circuit of a camera. Shown within Block 2 is an electrical circuit sub-assembly of the adaptor contained within Block 4 defined by equal length dash lines. Shown within Block 1 is an electrical circuit sub-assembly of the auto strobo unit contained within Block 5 defined by unequal length dash lines.

Specifically, the electrical circuit of the auto strobo unit comprises a main capacitor C1 connected across a power supply PS, and a series circuit including a resistor r1 and an illumination starting switch Sx. Also connected across the power supply are another series circuit including a flashlight emitting discharge tube L and an illumination controlling thyristor SCR1, and a further series circuit including a resistor r2 and an illumination interrupting thyristor SCR2, as shown. A primary winding TC1 of a trigger transformer TC is connected in series with a trigger capacitor C2 across the switch Sx. The transformer TC has a secondary winding TC2 which is connected with a trigger electrode TC0. The trigger capacitor C2 and the trigger transformer TC constitute together a trigger circuit for starting the flashlight illumination. A capacitor C3 is connected across the anodes of the illumination controlling thyristor SCR1 and the illumination interrupt thyristor SCR2 for interrupting the illumination from the discharge tube L. A resistor r3 is connected between the anode and the cathode of the thyristor SCR1. Another resistor r4 is connected across the gate and the cathode of the thyristor SCR2, and the gate of the thyristor SCR2 is also connected with an illumination interrupt terminal t3 which is adapted to be connected with an external circuit. The switch Sx also serves as an illumination test switch and has its opposite ends connected with a pair of terminals t1, t2 which are adapted to be connected with the adaptor. When the terminal t1 is connected with a terminal T1 which is provided within the adaptor, a positive voltage is supplied from the power supply PS to a positive bus E1 of the adaptor. Also, when the terminal t2 is connected with a terminal T2 of the adaptor, the negative terminal of the supply PS is connected with a negative bus E2 of the adaptor. In this manner, the adaptor is electrically fed from the power supply of the auto strobo unit.

The electrical circuit of the adaptor comprises a trigger signal feed circuit which applies a trigger signal to the trigger circuit of the auto strobo unit in response to the operation, i.e., closure of a synchro contact Cx of a camera, to be described later, a polarity inverter which changes the polarity of an illumination interrupt signal (the negative polarity in the present example) applied to the illumination interrupt terminal t3 of the auto strobo unit to the opposite polarity, namely, a positive polarity in the present example, for which the strobo unit is designed, and a further circuit which feeds an operating voltage to the polarity inverter.

The trigger signal feed circuit comprises a series circuit including a short-circuiting thyristor SCR3 and a diode D1 and another series circuit including a resistor R5, capacitor C6 and constant voltage diode ZD, both of which series circuits are connected across the positive and the negative busses E1, E2. The diode ZD is shunted by a capacitor C7, and a resistor R3 is connected across the gate and the cathode of the thyristor SCR3. A resistor R4 is connected between the gate of the thyristor SCR3 and the bus E2. A series circuit including a resistor R1 and a capacitor C5 is connected between the anode and the cathode of the thyristor SCR3 and the junction between the resistor R1 and the capacitor C5 is connected with one end of a resistor R2, the other end of which is connected with an external connection terminal T01. The purpose of resistor R1 is to prevent the main capacitor C1 from discharging through the synchro contact Cx to be described later. The negative bus E2 is connected with an external connection terminal T02, and these terminals T01 and T02 are connected with the opposite ends of the synchro contact Cx of the camera, respectively. The series circuit including components R5, C6, ZD operates in combination with capacitor C7 to provide a power supply which drives the polarity inverter. Specifically, it forms a negative supply -B which is connected with the collector of a transistor TR which will be described below. A drive circuit associated with the polarity inverter comprises a PNP amplifying transistor TR having its collector connected with the anode of the diode ZD, and its base connected through a resistor R7 with an external connection terminal T03, with a bias resistor R8 connected across the base and emitter thereof. The transistor TR is effective to operate the polarity inverter in response to an illumination interrupt signal of a negative polarity fed from the camera through the resistor R7 and to which it exhibits a high input impedance.

The polarity inverter comprises a series circuit including a resistor R6, a thyristor SCR4, a diode D2 and a resistor R11 connected across the busses E1, E2, with a capacitor C8 connected in shunt with the series combination of components SCR4 to R11. A resistor R10 is connected across the gate and the cathode of the thyristor SCR4, and another resistor R9 is connected between the gate and the bus E2. The cathode of the thyristor SCR4 is connected with the emitter of the transistor TR. The purpose of the resistor R11 is to derive an illumination interrupt signal as the capacitor C8 discharges through its shunt path, and the junction between the resistor R11 and the diode D2 is connected with an external terminal T3. It is to be noted that the terminal T3 is adapted to be connected with the illumination interrupt terminal t3 of the auto strobo unit. The purpose of the resistor R6 is to prevent a discharge of the main capacitor C1 through the thyristor SCR4 and to prevent a discharge of the capacitor C8 through the thyristor SCR3 when the synchro contact Cx is closed.

The photometric control circuit Ex of the camera which includes a light receiving element determines the amount of reflective light from an object being photographed during the flashlight illumination of the auto strobo unit, and produces an illumination interrupt signal of a negative polarity at the output terminal t03 when a proper exposure is reached. The terminal t03 is adapted to be connected with the terminal T03 of the adaptor. The synchro contact Cx has its opposite end connected with terminals t01, t02 which are in turn connected with the terminals T01, T02 of the adaptor, respectively.

In operation, when the auto strobo unit is mounted on the camera with the adaptor interposed therebetween, a main switch (not shown for purposes of simplicity) of the auto strobo unit may be closed. Thereupon, the main capacitor C1, trigger capacitor C2 and capacitor C3 of the auto strobo unit will be charged to the polarity shown. Also, capacitors C5, C6 and C8 of the adaptor will be charged to the polarity shown through the terminals t1, t2 and terminals T1, T2.

When the synchro contact Cx of the camera is closed under this condition, the capacitor C5 initially discharges through a path including resistor R2, terminals T01, t01, synchro contact Cx, terminals T02, t02, resistors R4, R3 and the gate-to-cathode path of the thyristor SCR3, thereby turning it on to short-circuit the path across the terminals t1, t2. Consequently, the trigger capacitor C2 discharges through the primary winding of the trigger transformer TC, whereby a trigger pulse is produced across the secondary winding TC2 and applied to the trigger electrode TC0. Simultaneously, a firing pulse is applied to the gate G of the thyristor SCR1 from a circuit, not shown, thus turning it on to initiate a flashlight illumination from the discharge tube L.

When the thyristor SCR3 is turned on, the capacitor C6 discharges through a path including resistor R5, thyristor SCR3, diode D1 and diode ZD, thereby producing a voltage supply -B of a negative polarity and having a magnitude which depends on the Zener voltage. It will be appreciated that the voltage supply -B is maintained for a time interval which is determined by the time constant of resistor R5 and capacitor C6. The time interval is chosen to cover the full illumination period of the strobo unit.

When a proper exposure has been given, as determined by the photometric control circuit Ex of the camera which receives the reflective light from an object being photographed which is in turn illuminated by the flashlight from the discharge tube L, the control circuit Ex produces an illumination interrupt signal of a negative polarity, which is applied to the base of the transistor TR through terminals t03, T03 and resistor R7. The transistor TR is then turned on to supply a voltage to the cathode of the thyristor SCR4 which is lower than the gate potential. Therefore SCR4 is turned on.

Thereupon the capacitor C8 discharges through a path including thyristor SCR4, diode D2 and resistor R11, producing a pulse of a positive polarity across the resistor R11. Thus it will be seen that the illumination interrupt signal of the negative polarity is converted into a positive polarity version, which is applied through terminal T3 to the illumination interrupt terminal t3 of the auto strobo unit. In response thereto, the thyristor SCR2 contained within the auto strobo unit is turned on to permit the capacitor C3 to discharge applying a reverse bias across the thyristor SCR1, thus immediately interrupting the flashlight illumination from the discharge tube L. The capacitor C8 has a sufficiently large capacitance so that when it discharges through the components SCR4, D2 and R11, a pulse voltage of a high magnitude is developed across the resistor R11, thus providing an amplified illumination interrupt signal of a positive polarity.

Figure 2:
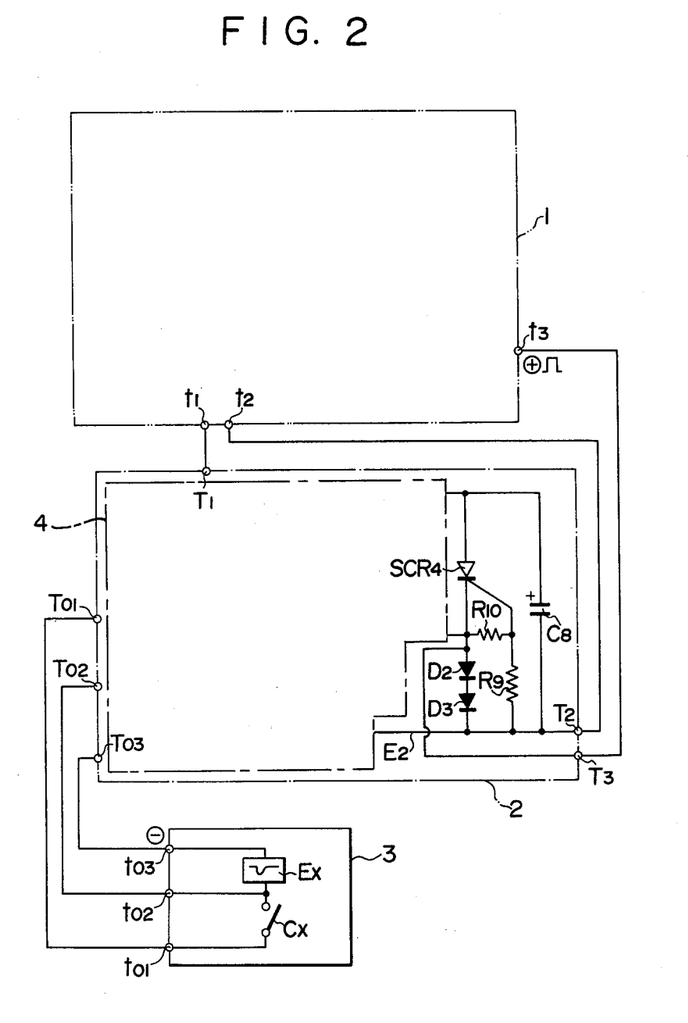
FIGS. 2 to 5 are circuit diagrams illustrating modifications of the adaptor shown in FIG. 1.

In the embodiment shown in FIG. 1, the resistor R11 is connected in series with diode D2 in order to derive an illumination interrupt signal of a positive polarity therefrom. However, the resistor R11 may be replaced by a diode D3 connected in series with the diode D2 and the junction between the thyristor SCR4 and the diode D2 may be connected with the terminal T3, as shown in FIG. 2 which illustrates a second embodiment of the invention. With this arrangement, when the thyristor SCR4 is turned on to permit the capacitor C8 to discharge through the components SCR4, D2 and D3, a pulse voltage of a positive polarity will be developed across the series combination of the diodes D2, D3 and will have a magnitude which depends on the forward voltage drops of the diodes. This voltage is derived as an illumination interrupt signal through the terminal T3 to be applied to the terminal t3 of the auto strobo unit.

In other respects, the arrangement of FIG. 2 is similar to that shown in FIG. 1 and therefore will not be described again herein below.

Figure 3:
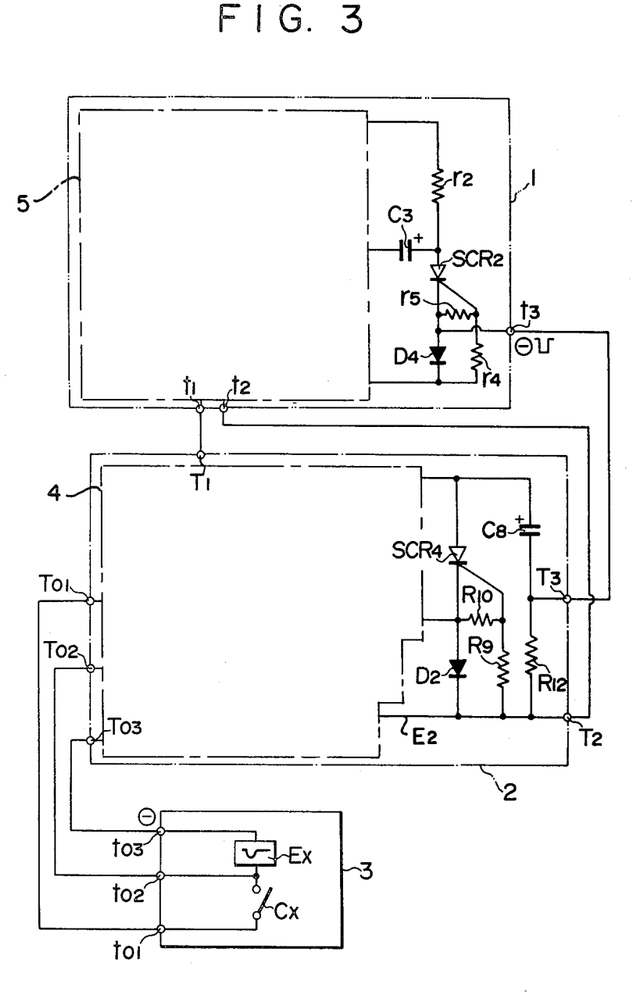

FIG. 3 shows another modification which represents a third embodiment of the invention. This embodiment is constructed of a combination of a photometric control circuit of an automatic exposure controlled camera which produces an illumination interrupt signal of a negative polarity and an auto strobo unit having an illumination interrupt terminal which is adapted to receive an illumination interrupt signal of a negative polarity for interrupting the illumination. In this instance, neither the camera nor the auto strobo unit has an amplifying feature for the illumination interrupt signal, and hence the adaptor of the invention is used to amplify the illumination interrupt signal to a required level.

In FIG. 3, the illumination interrupt terminal t3 of the auto strobo unit is connected with the anode of a diode D4 which is connected in series with the thyristor SCR2, with a resistor r5 bridging across the gate and cathode of the thyristor SCR2.

In other respects, the arrangement of the auto strobo unit of FIG. 3 is similar to that shown in FIG. 1 and already described above.

In this arrangement, the adaptor is similar to that described above except that the resistor R11 and the diode D3 respectively used in the first and second embodiments are removed and are replaced by a resistor R12 connected in series with the capacitor C8, with the junction between the resistor R12 and the capacitor C8 connected with the terminal T3.

In the third embodiment, when the thyristor SCR4 is turned on in response to an illumination interrupt signal of a negative polarity from the camera, the capacitor C8 discharges through a path including the thyristor SCR4, diode D2 and resistor R12. A discharge current of high magnitude which flows through the resistor R12 produces a negative pulse of a large magnitude, which pulse is applied to the terminal t3 of the auto strobo unit through the terminal T3, as an illumination interrupt signal.

Figure 4:
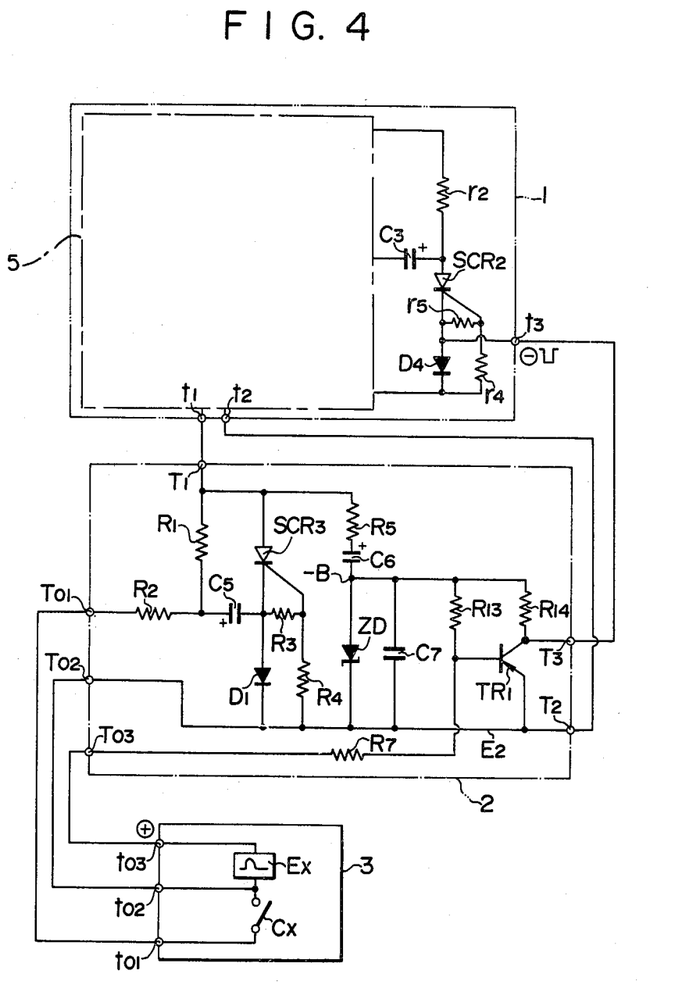

FIG. 4 shows a fourth embodiment of the invention which may be used when the camera produces an illumination interrupt signal of a positive polarity while the signal which is applied to the illumination interrupt terminal t3 of the auto strobo unit should be of a negative polarity.

The auto strobo unit of this embodiment is constructed in the same manner as that used in the third embodiment. The adaptor is similar to the previous embodiment (including block 5) except for the construction of a polarity inverter which will be mentioned below. Specifically, the polarity inverter comprises a PNP transistor TR1 and a pair of resistors R13 and R14 which are connected across the diode ZD. The transistor TR1 presents a high input impedance to an illumination interrupt signal of a positive polarity which is supplied from the camera, and functions to convert it into an amplified interrupt signal of a negative polarity. The transistor TR1 has its base connected through the bias resistor R13 with the anode of the diode ZD, its collector connected through the load resistor R14 with the same anode, and has its emitter connected with the bus E2. The base is also connected with the terminal T03 through a resistor R7, and the collector of the transistor TR1 is connected with the terminal T3.

In operation, as the capacitor C6 discharges, the diode ZD constitutes a voltage supply -B, turning the transistor TR1 on. When an illumination interrupt signal of a positive polarity is fed from the camera through resistor R7 to the base of the transistor TR1, the latter is turned off. Thereupon, a negative voltage having the magnitude of the voltage supply -B is developed at the collector electrode of the transistor TR1. The negative pulse is applied to the illumination interrupt terminal t3 of the auto strobo unit, immediately interrupting the illumination of the discharge tube L.

Figure 5:
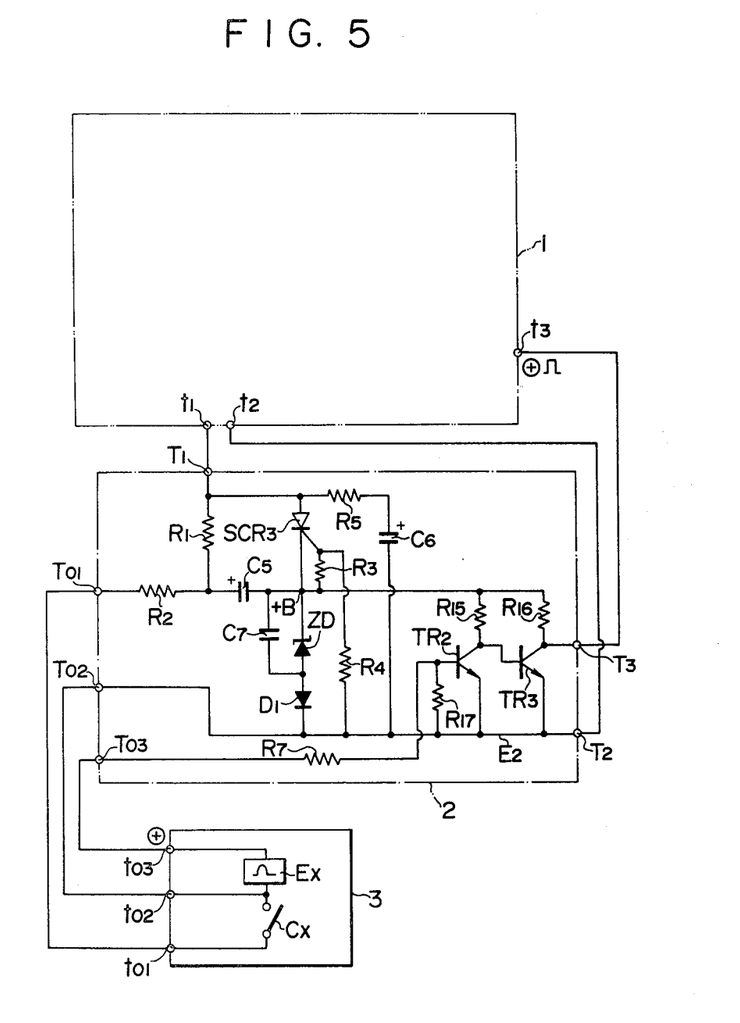

FIG. 5 shows a fifth embodiment of the invention which may be used for a combination of a camera which produces an illumination interrupt signal of a positive polarity and an auto strobo unit having an illumination interrupt terminal t3 to which a signal of a positive polarity should be applied. In this instance, the adaptor of the invention functions to amplify the illumination interrupt signal.

In this embodiment, the auto strobo unit 1 is completely the same as that used in the first embodiment. The adaptor is similar to that shown in the fourth embodiment except that the polarity inverter is replaced by an amplifier comprising NPN transistors TR2, TR3. However, because the transistors TR2, TR3 are of NPN type, their collectors should be fed from a positive supply and the diode ZD is poled in the opposite direction and is connected between the cathode of the thyristor SCR3 and the anode of the diode D1 together with the capacitor C7.

The transistors TR2, TR3 have their collectors connected with the cathode of the diode ZD through load resistors R15, R16, respectively, and have their emitters connected with the bs E2. The transistor TR2 presents a high input impedance to a signal of a positive polarity which is supplied from a camera. The transistor TR2 has its base connected with the terminal T03 through resistor R7 and also connected with the bus E2 through resistor R17, its collector connected with the base of the transistor TR3, the collector of which is connected with the terminal T3.

In operation, when the capacitor C6 discharges to permit the diode ZD to form a supply +B, the transistor TR3 is turned on. When an illumination interrupt signal of a positive polarity is fed from the camera and applied through resistor R7 to the base of the transistor TR2, the latter is turned on. Thereupon, the base potential of the transistor TR3 changes from +B level to zero, and thus is turned off. At this time, an amplified positive pulse is developed at the collector of the transistor TR3, having a magnitude corresponding to the level of the supply +B. This positive pulse is applied as an illumination interrupt signal from the terminal T3 to the illumination interrupt terminal t3 of the auto strobo unit, thus immediately terminating the illumination.

It should be understood that the polarity inversion means and amplifying means associated with the illumination interrupt signal are not limited to the forms shown, but can take a variety of forms. By way of example, a separate power supply may be provided within the adaptor without departing from the spirit of the invention.

What is claimed is:

1. An adaptor for use with a camera having (1) a synchro contact and (2) means for providing an illumination interrupt signal; and an auto strobo unit having (1) flashlight means, (2) a flashlight trigger circuit for enabling said flashlight means, and (3) flashlight termination means for disabling said flashlight means, said adaptor comprising:

a first coupling circuit responsive to operation of said synchro contact for initiating operation of said flashlight trigger ciruit; and a second normally disabled coupling circuit enabled by the operation of said first coupling circuit and said illumination interrupt signal for coupling a signal to said flashlight termination means to disable said flashlight means, said second coupling circuit including means to apply to said flashlight termination means a modified illumination interrupt signal having a signal strength and polarity which is sufficient to effectively disable said flashlight means whereby said adaptor renders said camera effective to operate said auto strobo unit.

2. An adaptor according to claim 1 in which said second coupling circuit comprises means for amplifying the illumination interrupt signal and inverting the polarity thereof.

3. An adaptor according to claim 1 in which said first coupling circuit comprises a first series circuit including a short-circuiting thyristor and a diode, said thyristor being rendered conductive when the synchro contact of said camera is closed, a second series circuit contained in the flashlight trigger circuit of said strobo unit and comprising a trigger capacitor and the primary winding of a trigger transformer, said second series circuit being connected to said first series circuit.

4. An adaptor according to claim 1 in which said second coupling circuit comprises a first series circuit adapted to be fed from a power supply housed within the strobo unit and including a first resistor, a thyristor, a diode and a second resistance element; a third resistor connected across the gate and the cathode of said thyristor; a capacitor connected in shunt with the series combination of said thyristor, said diode and said second resistor and adapted to discharge therethrough when it is rendered conductive, thereby developing an amplified illumination interrupt signal of predetermined polarity across the second resistor; and a forth resistor connected across the series combination of said third resistor, said diode and said second resistor, said adaptor further including a drive supply formed by a series combination of a fifth resistor, a second capacitor and a constant voltage diode and forming a constant voltage source when the trigger signal feed circuit is operated by said synchro contact, and a drive circuit including an amplifying transistor having its collector connected with the anode of the constant voltage diode, its base connected to a sixth resistor to receive said illumination interrupt signal from said camera, a seventh bias resistor connected across the base and the emitter thereof, the polarity inverter being driven from said constant voltage source through said drive circuit to amplify and reverse the polarity of said illumination interrupt signal at the junction between said second resistor and said diode for application to the illumination interrupt terminal of said strobo unit.

5. An adaptor according to claim 4 in which said second resistance element comprises a second diode, with the illumination interrupt signal of an inverted polarity being derived from the junction between the thyristor and the first-mentioned diode.

6. An adaptor according to claim 1 in which said second coupling circuit comprises a PNP transistor, a load resistor and a bias resistor, the adaptor also including a drive supply formed by a series circuit including a resistor, a capacitor and a constant voltage diode and forming a constant voltage source when the first coupling circuit is operated, the transistor having emitter, collector and base electrodes, respectively, connected with the cathode of the constant voltage diode, through said load resistor with the anode of the constant voltage diode and through said bias resistor with the anode of the constant voltage diode, the base of the transistor being adapted to receive an illumination interrupt signal which is fed from the camera, and for inverting the polarity of said illumination interrupt signal, said inverted signal appearing at the junction between the load resistor and the collector of the transistor for application to an illumination interrupt terminal of said strobo unit.

7. For use with a camera having a synchro contact and means for generating an illumination interrupt signal and an auto strobo unit having a flashlight control circuit and a termination signal terminal, an adaptor comprising:
a trigger signal coupling circuit for enabling said flashlight control circuit of said auto strobo unit in response to the closure of the synchro contact of said camera, amplifier means for amplifying said illumination interrupt signal to a given level before it is applied to the illumination termination signal terminal of said strobo unit, and circuit means for enabling said amplifier means when the trigger signal coupling circuit is operated.

8. An adaptor according to claim 7 in which said amplifier means comprises a first series circuit connected to be fed from a power supply housed within the strobo unit and including a first resistor, a thyristor and a diode; a second resistor connected across the gate and the cathode of the thyristor; a second series circuit including a capacitor and a third resistor and connected in shunt with the series combination of said thyristor and said diode, said capacitor discharging through said series combination when said series combination is rendered conductive to develop an amplified illumination interrupt signal across the third resistor; and a fourth resistor connected in shunt with the series combination of said second resistor and said diode, the adaptor also including a drive supply formed by a third series circuit including a fifth resistor, a supply capacitor and a constant voltage diode and forming a constant voltage source when the first series circuit is operated, and also including a drive circuit comprising an amplifier transistor having its collector connected with the anode of the constant voltage diode and having its base connected to receive an illumination interrupt signal from said camera through a sixth resistor, with a seventh bias resistor connected across the base and the emitter thereof, the polarity inverter being driven from the drive supply through the drive circuit to develop an amplified illumination interrupt signal at the junction between the third resistor and the first-mentioned capacitor for application to the illumination interrupt terminal of said strobo unit.

9. An adaptor according to claim 7 in which said amplifier means comprises a pair of NPN transistors having their emitters connected in common, the collector of one of said NPN transistors being connected with the base of the other one of said NPN transistors, a pair of load resistors each having one of their terminals connected with the collector of an associated one of the respective NPN transistor, and a bias resistor connected with the base of said one NPN transistor, the adaptor also including a drive supply formed by a first series circuit connected to be fed from a power supply housed within said strobo unit and including a thyristor, a first constant voltage diode and a second diode, and a second series circuit connected in shunt with the first series circuit and including a resistor and a supply capacitor, said NPN transistors having their emitters connected with one end of the series combination of the constant voltage diode and the diode of said load resistors having their remaining terminals connected with the other end of the series combination of said first and second diodes, the base of said one NPN transistor being adapted to receive an illumination interrupt signal from said camera for producing an amplified illumination interrupt signal at the junction between the load resistor connected to said other NPN transistor and said other NPN transistor for application to an illumination interrupt terminal of the strobo unit.

* * * * *

UNITED STATES PATENT AND TRADEMARK OFFICE
CERTIFICATE OF CORRECTION

PATENT NO. : 4,222,647
DATED : September 16, 1980
INVENTOR(S) : Osamu Kawarada, et al It is certified that error appears in the above—identified patent and that said Letters Patent is hereby corrected as shown below:

Column 7, line 25, change "bs" to --bus--.

Signed and Sealed this

Twenty-eighth Day of April 1981

[SEAL]

Attest:

RENE D. TEGTMEYER

Attesting Officer

Acting Commissioner of Patents and Trademarks